MEANS FOR ACTIVATING A CERTAIN INSTRUCTION OUT OF A PLURALITY OF INSTRUCTIONS STORED IN THE INSTRUCTION MEMORY OF A COMPUTER
Filed Dec. 27, 1966
2 Sheets-Sheet 1
Fig. 1
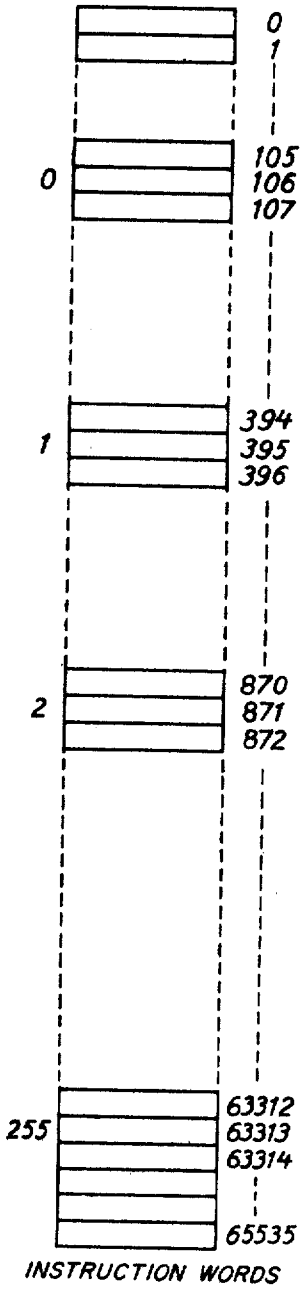
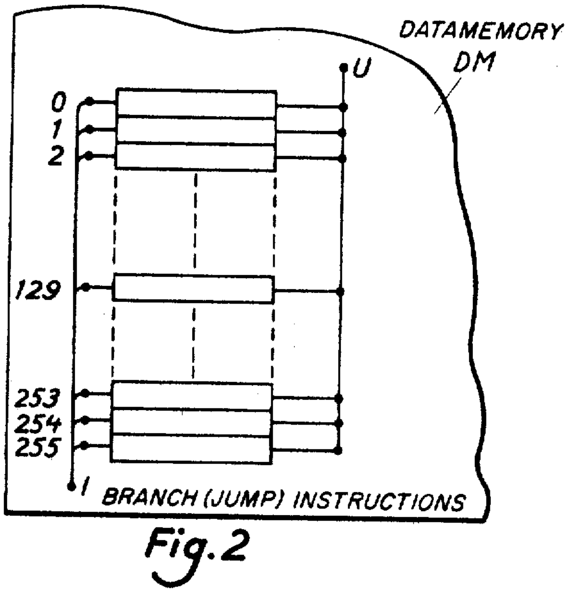
Fig. 2
OK2 - OK16 a.
OKX - OK13 b.
OK22 - OK13 c.
L-SE - L-DM d.
OK9 - OK7 e.
L-SE - L-IM f.
Fig. 4
OK2 - OK1 a.
L-SE - L-DM b.
OK9 - OK20 c.
Fig. 5
INVENTORS
Oleg Avsan
Lars-Olof Norén
Gunnar Eric William Sparrendom
Ake Bertil Fredrik Svensson
BY Hane and Nydick
ATTORNEYS OLEG AVSAN
LARS-OLOF NORÉN
GUNNAR ERIC WILLIAM SPARRENDAHL
ÅKE BERTIL FREDRIK SVENSSON
INVENTORS BY Hane and Nydick
ATTORNEYS United States Patent Office 3,475,732
Patented Oct. 28, 1969

3,475,732

MEANS FOR ACTIVATING A CERTAIN INSTRUCTION OUT OF A PLURALITY OF INSTRUCTIONS STORED IN THE INSTRUCTION MEMORY OF A COMPUTER

Oleg Avsan, Huddinge, Lars-Olof Noren, Enskede, Gunnar Erik William Sparrendahl, Vendelso, and Ake Bertil Fredrik Svensson, Hagersten, Sweden, assignors to Telefonaktiebolaget L M Ericsson, Stockholm, Sweden, a corporation of Sweden Filed Dec. 27, 1966, Ser. No. 604,830
Claims priority, application Sweden, Feb. 25, 1966, 2,529/66
Int. Cl. G11b *13/00*
U.S. Cl. 340—172.5 1 Claim

ABSTRACT OF THE DISCLOSURE

In a computer system there is an instruction memory and a data memory. A portion of the data memory is reserved to store the addresses of registers in the instruction memory which contain certain desired instructions. In the course of performing a program, if an instruction calls for a jump to one of the certain desired instructions, the address portion of the jump instruction is used to select a related register in the data memory where is stored the actual address in the instruction memory where the certain desired instructions will be found.

Figure 3:
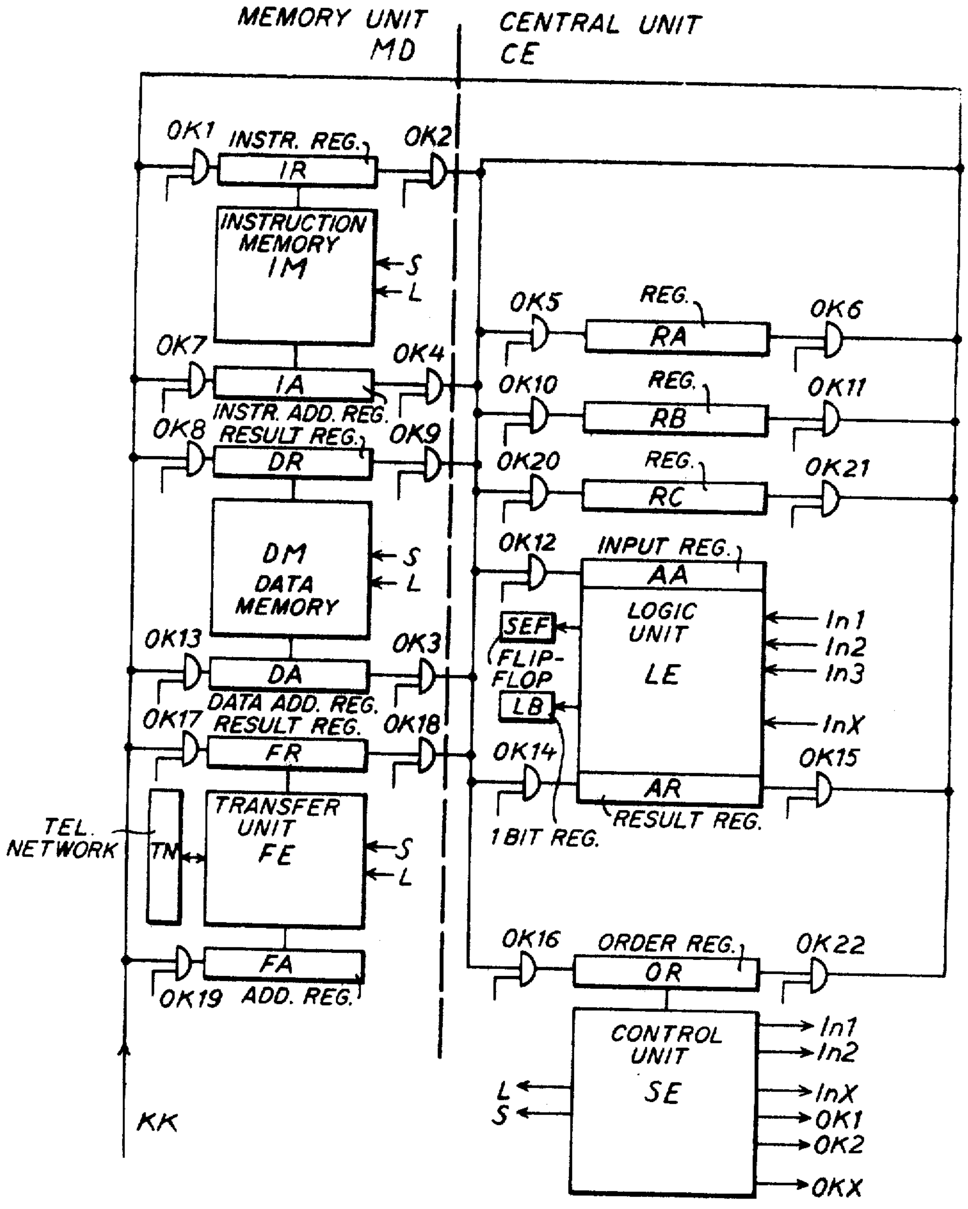

The present invention concerns a means for activating a certain instruction out of a plurality of instructions stored in the instruction memory of a computer. The means includes besides the instruction memory a data memory, a control unit and a number of controlled connecting means connecting the memories with the control unit, which connecting means are adapted, under influence from the control unit, to close and open the connecting circuits between the memories and the control unit, according to microprograms recorded in advance.

An object of the invention is to facilitate a better utilization of the instruction memory, compared with the conditions in earlier known computers, and to decrease the machine time necessary for the execution of a program including many instructions.

According to the invention there are provided means for obtaining a certain instruction from a plurality of instructions stored in a computer instruction memory, which means comprise an instruction memory with an associated address register and instruction register, a data memory with an associated address register and result register, recorded microprograms, a control unit with an associated order register, and a number of controlled connecting means connecting the memories with the control unit and providing connecting circuits between the memories and the control unit. The connecting means are arranged to be controlled by the control unit to close and open the connecting circuits according to the microprograms. The data memory including a fixed table of addresses of certain only of the plurality of instructions, the table being arranged to be fixed at least for the duration of the following operations which the connecting circuits are arranged to carry out: *first* to transfer into the order register associated with the control unit an instruction which is to be decoded by the control unit; *and then*, if the content of the instruction implies obtaining one of the certain insrtuctions, to transfer between the control unit and the address register associated with the data memory a fixed item of information indicating the address of the whole of the fixed table of addresses and to transfer between the order register and the address register part of the instruction transferred into the order register as aforesaid, indicating a determined input out of a plurality of inputs of the fixed table of addresses, in consequence of which in the result register associated with the data memory the address of said one of the certain instructions is obtained from the table; *and finally* to transfer between the result register and the address register associated with the instruction memory the address of said one of the certain instructions which said one of said certain instructions in consequence thereof is obtained in the instruction register associated with the instruction memory.

The invention will be described in more detail with reference to the accompanying drawings in which FIG. 1 shows diagrammatically a main program, FIG. 2 shows a portion of a data memory, FIG. 3 shows a block diagram of the computer, and FIGS. 4 and 5 show the functional operations of certain circuits included in the computer according to FIG. 3.

While the invention will be described in connection with a computer system operating in connection with a telephone network, it should be apparent that the invention can be used with any computer system having a program with jump instructions.

The main program shown in FIG. 1 includes a large number of instructions each consisting of 16 bits which are stored in the instruction memory of the computer. The instructions are to the right on the drawing provided with ordinal numbers in numerical sequence: 0, 1 . . . 105, 106, 107 . . . 394, 395, 396 . . . 870, 871, 872 . . . 63 312, 63 313, 63 314 . . . 65 535. A certain program of the computer includes a plurality of instructions which are activated in a predetermined sequence. Upon the execution of such a program it may be supposed that, dependent on one or more results to which the computer comes, one or more subsequent instructions of the program can or shall be jumped over. It is supposed, for example, that when a certain program has been carried through to tne instruction 77 then a jump shall be made from there to the instruction 106, and that from the instruction 270 a jump shall take place to the instruction 395. An execution of actual programs has proved that there are only a few instructions to which such jumps often occur. At a jump from one instruction, for example 270, to another instruction, for example 395, the first mentioned instruction should contain an address indication to the last mentioned instruction. This has given rise to the idea that it could be possible to give these address indications the form of shortened addresses which are later on translated into real addresses. Consequently, the number of required bits in the address indications of the instructions is decreased, and therefore the instruction memory can be utilized more satisfactorily. In the main program according to FIG. 1 a total of 65 535 instructions are assumed to be included wherein only 256 are jumped to relatively often. These last instructions are provided with shortened ordinal numbers 0,1,2,3 . . . 255 which is indicated to the left on the drawing. In FIG. 2 a section of the data memory DM of the computer is shown where complete addresses of the instructions having shortened ordinal numbers are collected in a fixed table. This table has 256 inputs and one output. With a signal on one of these inputs, corresponding to the shortened address (for Example 2) of a certain instruction there will be obtained on the output U the complete address of this certain instruction, i.e. 871.

In order to explain in more detail the idea of the invention a simplified computer is first described in general terms, the computer being built up in such a way that it can carry out the operations necessary for controlling an arbitrary system, consisting of a plurality of co-operating means, e.g. machine tools or telephone circuits. A computer used in practice has a more complicated organization so that only a minimum number of circuits and stages necessary for the carrying out of an operation are used. The fundamental function of the computer is however independent of such considerations and in order to facilitate the description it is convenient to make the number of circuits included in the computer as small as possible.

The computer can be divided into two main parts; a memory part MD including a number of memories and a central unit CE including a number of registers, an arithmetic unit and a control unit for the microprogram (compare FIG. 3).

The memory part comprises an instruction memory IM in which the instructions which are to be carried out by the computer are stored, each at its definite address in the form of, for example, 16-digit binary words. These instructions are read out sequentially or in some other sequence prescribed by the program and every instruction implies the carrying out of a number of definite operations which are associated with this instruction and are determined through the microprogram of the computer. The microprogram can cause reading information out of and writing information into the different means, transferring of information from one means to another, the carrying out of logical operations in the arithmetic unit, etc. in a sequence and in a number of stages determined by the particular instruction. The instruction memory IM is provided with an address register IA for receiving the address of the desired instruction in the instruction memory, and with an instruction register IR to which an instruction which has been indicated by means of the address register IA, can be transferred from the instruction memory IM in order to be supplied to the remaining means. Alternatively an instruction can be supplied from an external means to the instruction memory IR and simultaneously there is fed to the address register IA an address indicating where the instruction is to be placed in the instruction memory IM. The last mentioned operation normally does not take place in the normal function of the computer but only upon a change in the program. Normally only the reading out of instructions takes place. The possibility of writing in as well as reading out is symbolized by the letters S and L in the block diagram in FIG. 3.

In the data memory DM annotations of occasional information takes place during the operation of the computer in, for example, 16-digit binary words. This information could, for example, concern the momentary condition of the different means in the telephone network, storing of digit signals etc. The data memory DM has in the same way as the instruction memory IM, an address register DA. The data memory also has a transfer register DR which interfaces with the data memory DM. Information to be written into a register of the data memory indicated by address register DA is temporarily stored therein or the contents of a register of data memory DM indicated by the address register DA is transferred thereto in order to be forwarded to remaining means in dependence on the reception of a writing- or reading instruction as indicated by S and L, respectively. In the essential construction there is consequently no difference between the instruction memory IM and the data memory DM; the difference lies in the manner of their use.

A further memory means, the transfer unit FE, serves the purpose of a controlling means located outside the computer itself, for example connecting means in an automatic telephone exchange and for detecting the condition of these means respectively. In regard to the difference in operating speed between the computer and, for example, the electromagnetic means which form part of a telephone exchange, a memory function is necessary, on one hand for storing operating instructions received from the computer in the form of, for example, 16-digit binary words until the relatively slow electromagnetic means have been actuated, and on the other hand for storing the condition information received from the electromechanic means until the condition information can be detected by the computer. In a binary word which implies an operation, instruction, "1" signifies that in a selected group of 16 relays, the relays associated with the respective digit position should be operated and "0" signifies that the relays associated with the respective digit position should be released. In a similar way, "1" signifies, in the case of condition sampling, that in a selected group of 16 relays the relays associated with the respective digit position are operated, and "0" signifies that they are released. Thus it is seen that the function of the transfer unit FE is, from the point of view of the computer, very similar to the function of the instruction memory IM and the function of the data memory DM, because the transfer unit similarly to said memories receives in its address register FA an address from the central unit, and either can cause, through its result register FR, operation of the relay determined by the contents of the result register FR in the 16-group of relays in the telephone network TN, determined by the address register FA, or alternatively can cause writing into the result register FR of the condition of those relays in the telephone network TN which are included in the 16-group indicated by the address register FA. Said two alternative possibilities are in the same way as for memories IM and DM symbolized by the letters L and S respectively.

The central unit CE of the computer includes, according to the embodiment, three registers RA, RB and RC (FIG. 3) in the case of each of which a 16-digit binary word can be supplied to, stored in and read out. An essential part is the logical unit LE which can carry out different arithmetic operations, for example addition, subtraction, comparison, logic exclusive or-functions etc. The logical unit LE is supplied by an input register AA and has a result register AR for recording of one of two operands, so that the result of addition or subtraction is obtained in the result register in such a way that the binary word written into the last mentioned register is changed to the calculation result. At logical comparison operation an indication is obtained from an indicator, for example an indicating flip-flop SEF, which upon conformity indicates "0" while upon deviation indicates "1." Furthermore there is a bit address register LB which in case of an inequality upon comparison between two 16-digit binary words indicates the digit position of for example the lowest digit position in which an inequality has occurred.

A third essential part of the central unit CE is the control unit SE which determines the transferring of information between the different registers, in other words the microprogram which, for every item of information, is determined in the control unit by means of fixed connections. This unit has an order register OR in which an order is loaded from the instruction register IR. The control unit decodes the binary word which has been written into the order register in which binary word there may be, for example, 4 bits to indicate 16 possible operations, so that one of 16 conductors is activated. The conductor selected in this way determines, together with a number of conductors, which are activated sequentially, the feeding in and feeding out of information to and from the registers and the logic operations respectively. All the registers can be connected to a common 16-wire conductor (transfer bus) which is FIG. 3 is indicated by one single conductor, via and-circuits OK1–OK22 the other input conditions of which are determined by the outputs of the control unit SE. As mentioned above the selected outputs are activated sequentially and so that sequentially at least two and-circuits are opened simultaneously to make possible on the one hand the feeding out of a 16-digit binary word to the common conductors and on the other hand the feeding of this word to one of the registers whose input circuit is open. As indicated in FIG. 3 some of the registers have both input and output gates through which input to as well as output from the registers is to take place while some of the registers are provided only with input gates from the common 16-wire conductor, as their contents is not fed out directly to the common conductors.

The control unit SE is primarily a group of decoding circuits which decode the 4-bit parallel words from the order register OR and generate the In1 to InX, OK1 to OKX, and L and S signals are required for the operation of the system. Since the decoding circuits are well known, e.g., and-gate decoders or function tables and timing chains and their exact configuration is readily determinably by analyzing the sequences to be performed, they will not be described in detail.

As was mentioned previously the data memory DM includes a fixed table of addresses only of certain of the instructions included in the instruction memory IM. The connecting means OK1 . . . OK22, OKX connecting the memories IM and DM of the computer with the control unit SE are adapted, under influence from the control unit SE, to carry out the following functions. By activating the means OK2 and OK16 *first* there is transferred between the instruction register IR and the order register OR a first instruction which is decoded by the control unit SE. If this transferred content of the instruction calls for a second instruction, the real address of which is included in the fixed table of addresses of the computer DM there will *then* be transferred, by activating the means OKX and OK13, between the control unit SE and the address register DA an instruction part indicating the address of the whole fixed table of addresses in the data memory, and, by activating the means OK22 and OK13, there will be transferred between the order register OR and the address register DA an address part, more exactly the eight last significant bits, of the first instruction transferred from the instruction register IR, indicating a determined input out of all inputs of the fixed table in the data memory DM, in consequence of which in the result register DR of the data memory DM the real address of the second instruction is obtained from the fixed table. By activating the means OK9 and OK7 there is *finally* transferred between the result register DR and the address register IA said real address of the second instruction which is transferred a signal to the L-input of the instruction memory IM to the instruction register IR and consequently is activated. The function of the different means are symbolically indicated in shortened form in FIG. 4.

By way of comparison the process, when the instruction register IR receives an instruction that does not imply a jump but another activity, for example transferring of certain data information from the data memory DM to the register RC, will be shown diagrammatically. By activating the means OK2 and OK16 *first* there is transferred between the instruction register IR and the order register OR the actual instruction which is decoded by the control unit SE. It is assumed that the address of the data information that shall be transferred is, owing to earlier activity, already found in the address register DA. A signal to the L-input of the data memory feeds out said data information to the result register DR. By activating the means OK9 and OK20 said data information is transferred from the result register to the register RC where thus it is available for subsequent functions. The instruction is therewith concluded. The functions of the different means in this case are symbolically indicated in shortened form in FIG. 5.

We claim:

1. In a computer system comprising, at least an instruction memory having addressed locations for storing all of the instructions of a program wherein at least a certain one of the instructions stored therein indicates that the next instruction to be performed is one of a particular group of instructions and said certain one instruction includes an abreviated address associated with said next instruction, said instruction memory having associated therewith an instruction address register and an instruction register whereby the contents of the location associated with an address stored in said instruction address register is transferred to said instruction register, a data memory having addressed locations for storing data, a data memory address register and a data transfer register whereby data can be transferred between said data transfer register and the position in said data memory associated with an address stored in said data memory address register, apparatus for fetching said one instruction of said particular group of instruction, said apparatus comprising a specific portion of said data memory having a plurality of particular addressed locations, each of said particular addressed locations storing the address of a position in said instruction memory wherein a different one of the instructions of said particular group of instructions is stored; first means for sensing the contents of said instruction register for the condition that the instruction stored therein indicates whether the next instruction to be performed is one of said particular group of instructions; second means responsive to the sensing of said condition by said first means for making available said specific portion of said data memory and for transferring said abbreviated address portion of the instruction stored in said instruction register to said data memory address register so that the address of the next instruction to be performed is transferred from the particular addressed location of said data memory as specified by the then contents of said data memory address register to said data transfer register; and third means for transferring the address then stored in said data transfer register to said instruction address register whereby the contents of the addressed location specified by the address stored in said instruction address register is transferred to said instruction register, said contents being the next instruction to be performed.

References Cited

UNITED STATES PATENTS

| | | | |
|---|---|---|---|
| 3,201,761 | 8/1965 | Schmitt et al. ------ | 340—172.5 |
| 3,292,155 | 12/1966 | Neilson ----------- | 340—172.5 |
| 3,363,234 | 1/1968 | Erickson et al. ---- | 340—172.5 |
| 3,366,929 | 1/1968 | Mullery et al. ------ | 340—172.5 |

JOHN P. VANDENBURG, Primary Examiner